United States Patent
Webber et al.

(10) Patent No.: US 10,633,009 B2
(45) Date of Patent: Apr. 28, 2020

(54) AXIALLY-EXPANDABLE COOLER CART AND ITS METHOD OF USE

(71) Applicants: Daniel Robert Webber, Cincinnati, OH (US); Michael Scott Goldstein, Cincinnati, OH (US)

(72) Inventors: Daniel Robert Webber, Cincinnati, OH (US); Michael Scott Goldstein, Cincinnati, OH (US)

( * ) Notice: Subject to any disclaimer, the term of this patent is extended or adjusted under 35 U.S.C. 154(b) by 0 days.

(21) Appl. No.: 16/250,023

(22) Filed: Jan. 17, 2019

(65) Prior Publication Data

US 2019/0217877 A1 Jul. 18, 2019

Related U.S. Application Data

(60) Provisional application No. 62/618,144, filed on Jan. 17, 2018.

(51) Int. Cl.
| | |
|---|---|
| *B62B 1/20* | (2006.01) |
| *B62B 5/06* | (2006.01) |
| *B62B 1/22* | (2006.01) |
| *B62B 1/26* | (2006.01) |

(52) U.S. Cl.
CPC ............... *B62B 1/20* (2013.01); *B62B 1/22* (2013.01); *B62B 1/26* (2013.01); *B62B 5/068* (2013.01)

(58) Field of Classification Search
CPC .... B62B 1/20; B62B 1/22; B62B 1/26; B62B 5/068
USPC ................................................. 280/35, 79.11
See application file for complete search history.

(56) References Cited

U.S. PATENT DOCUMENTS

| | | | |
|---|---|---|---|
| 1,788,150 A | 1/1931 | Curtin | |
| 2,375,338 A | 5/1945 | Alexander | |
| 2,392,926 A | 1/1946 | Kelly | |
| 2,439,660 A | 4/1948 | Keil | |
| 2,650,105 A * | 8/1953 | Costikyan | A45C 13/385 280/35 |
| 2,683,609 A | 7/1954 | Altemus | |
| 2,696,990 A | 12/1954 | Davis | |
| 2,730,373 A | 1/1956 | Blevins et al. | |

(Continued)

OTHER PUBLICATIONS

Badger Wheels, "Single Axle for Yeti Tundra 35-160", downloaded from www.amazon.com/gp/product/b00o7adtes, on May 4, 2017 (5 pages).

(Continued)

*Primary Examiner* — John D Walters
(74) *Attorney, Agent, or Firm* — Daniel F. Nesbitt; Hasse & Nesbitt LLC

(57) ABSTRACT

A two-wheeled, axially-expandable cart having an axially-expandable platform that includes a pair of platform members that are moveable axially between a collapsed position where the edges of the platform members are confronting, and an expanded position when the edges are space apart, and a pair of wheels, each wheel connected through an axle to and extending axially from each platform member. The two-wheeled cart provides a method for hauling an insulated cooler, where the cooler is positioned onto the platform assembly with its center of gravity forward of the platform assembly, and with an extending strap member laced through a front handle of the cooler, for raising the front end of the cooler off the ground and pulling the cooler forward, secured to the two-wheeled cart.

7 Claims, 7 Drawing Sheets

(56) References Cited

U.S. PATENT DOCUMENTS

| | | | |
|---|---|---|---|
| 2,883,731 | A | 4/1959 | Wells |
| 2,919,138 | A | 12/1959 | Brower et al. |
| 3,539,194 | A | 11/1970 | Stiles |
| 3,591,194 | A | 7/1971 | Vega |
| 3,754,773 | A | 8/1973 | Bruno |
| 3,891,245 | A | 6/1975 | Elsas |
| 3,912,139 | A | 10/1975 | Bowman |
| 3,963,256 | A | 6/1976 | Stafford |
| 3,995,565 | A | 12/1976 | Kersey |
| 4,451,053 | A | 5/1984 | Alioa et al. |
| 4,545,592 | A * | 10/1985 | Taskovic ............... A45C 13/385 280/35 |
| 4,846,493 | A | 7/1989 | Mason |
| 4,873,841 | A | 10/1989 | Bradshaw et al. |
| 4,950,123 | A | 8/1990 | Brockhaus |
| 4,976,448 | A | 12/1990 | Wickersham et al. |
| 5,169,164 | A * | 12/1992 | Bradford ................... B62B 1/20 190/18 A |
| 5,249,823 | A | 10/1993 | McCoy et al. |
| 5,313,817 | A | 5/1994 | Meinders |
| D348,132 | S | 6/1994 | McCoy et al. |
| 5,988,658 | A | 11/1999 | Ritchie et al. |
| 6,305,513 | B1 | 10/2001 | Lu |
| 6,328,364 | B1 | 12/2001 | Darbishire |
| 6,659,524 | B1 | 12/2003 | Carlson |
| D491,727 | S | 6/2004 | Koenig et al. |
| 6,783,147 | B1 | 8/2004 | Green, Sr. |
| 6,923,468 | B1 * | 8/2005 | Barnett ..................... B62B 3/04 280/35 |
| 7,237,817 | B2 | 7/2007 | Kobylski et al. |
| 7,441,783 | B2 | 10/2008 | Clark et al. |
| 8,123,236 | B1 | 2/2012 | Helenihi |
| 9,010,770 | B2 * | 4/2015 | Cantrell ................ B62B 5/0083 280/35 |
| 9,199,657 | B2 | 12/2015 | Martin |
| 9,387,891 | B2 | 7/2016 | Richins |
| 9,758,184 | B1 * | 9/2017 | Vaverek .................... B62B 1/20 |
| 2006/0070837 | A1 | 4/2006 | King et al. |
| 2006/0208440 | A1 | 9/2006 | Clark et al. |
| 2007/0187915 | A1 | 8/2007 | Filiatrault |
| 2007/0210599 | A1 | 9/2007 | Arnold |
| 2008/0136206 | A1 | 6/2008 | McKelvey |
| 2013/0140119 | A1 | 6/2013 | Hogan et al. |
| 2015/0048642 | A1 | 2/2015 | Williams |
| 2015/0115555 | A1 | 4/2015 | Cates |

OTHER PUBLICATIONS

DIY Cheap Beach, "Tailgate Fishing Cart", downloaded from www.reddit.com/r/diy/comments/25uxyz/diy_cheap_beach_tailgate_fishing cart, on May 5, 2017 (2 pages).

Academy Sports & Outdoors, "Mighty Max Cart—Expandable Flatbed Cart", downloaded from www.academy.com/shop/pdp/mighty-max-cart-expandable-flatbed-cart, on May 5, 2017 (8 pages).

U.S. Appl. No. 29/615,043, filed Aug. 25, 2017, Webber, et al.

\* cited by examiner

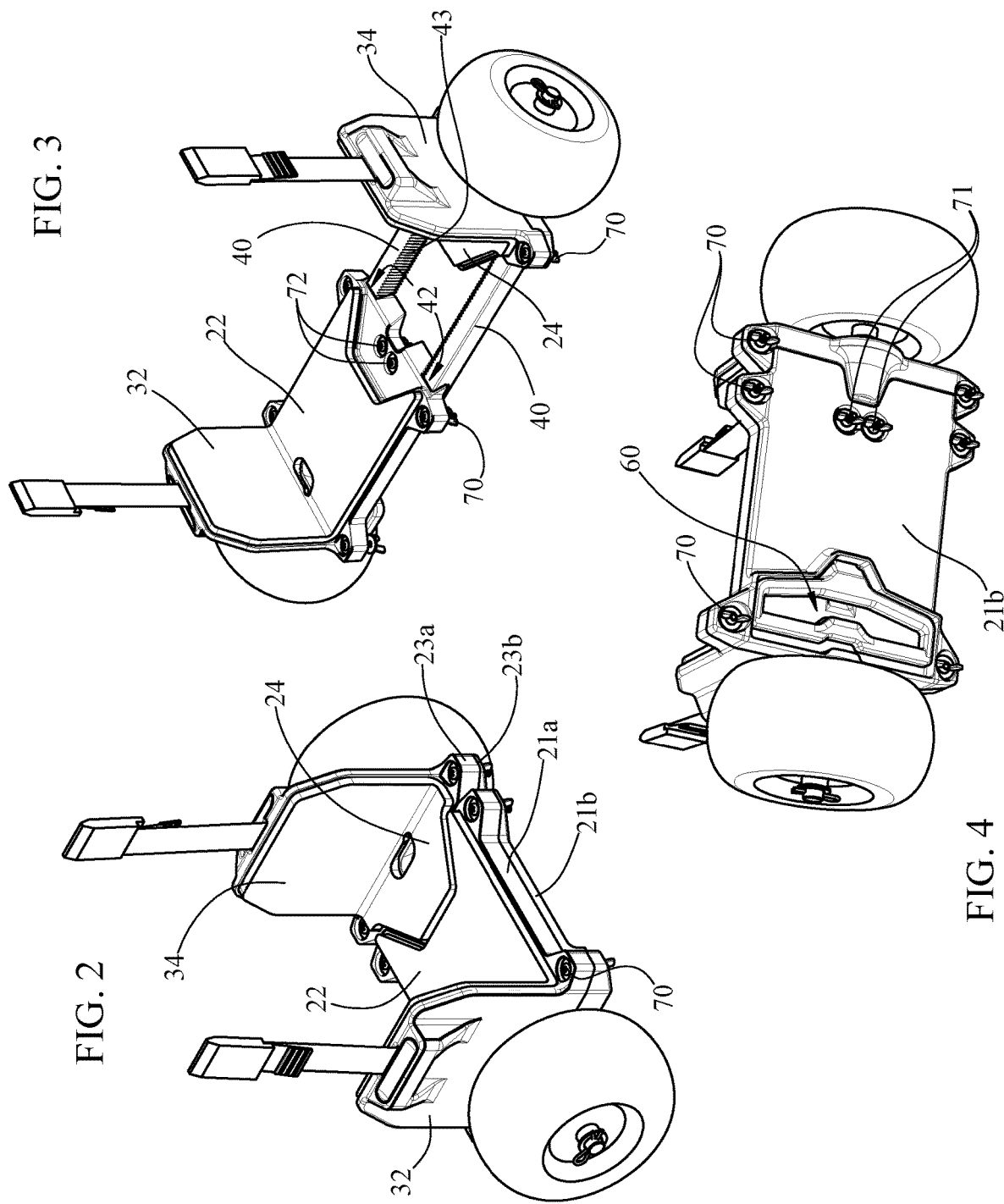

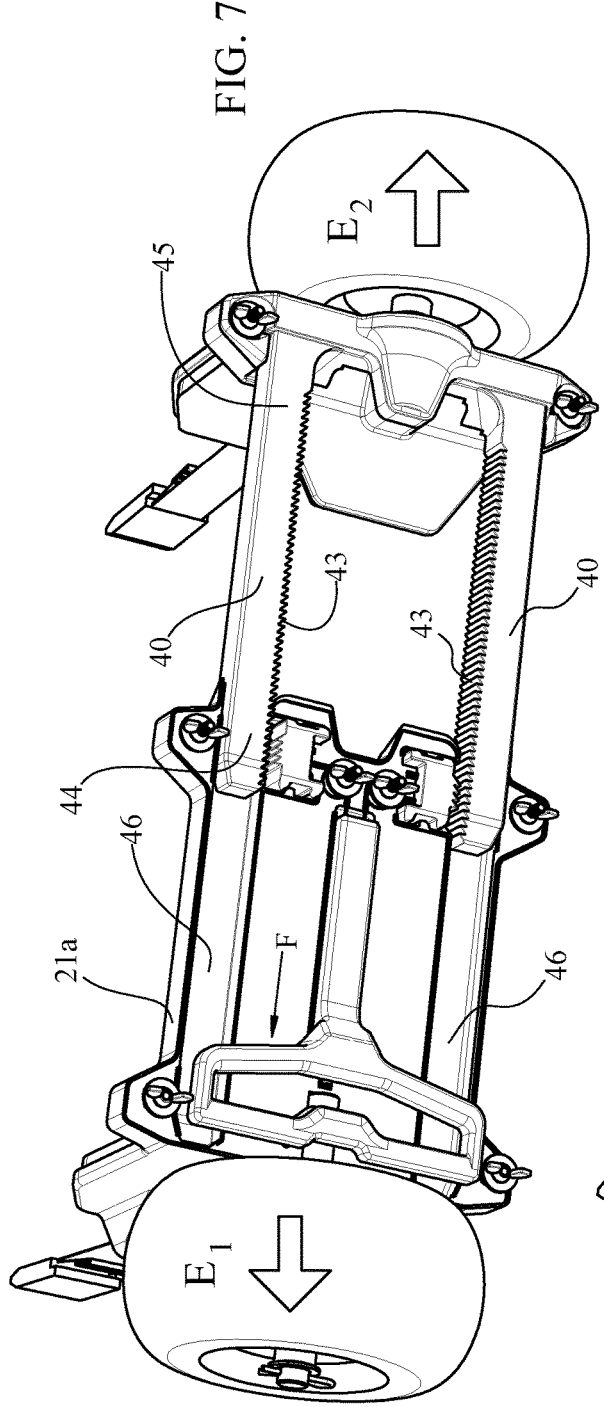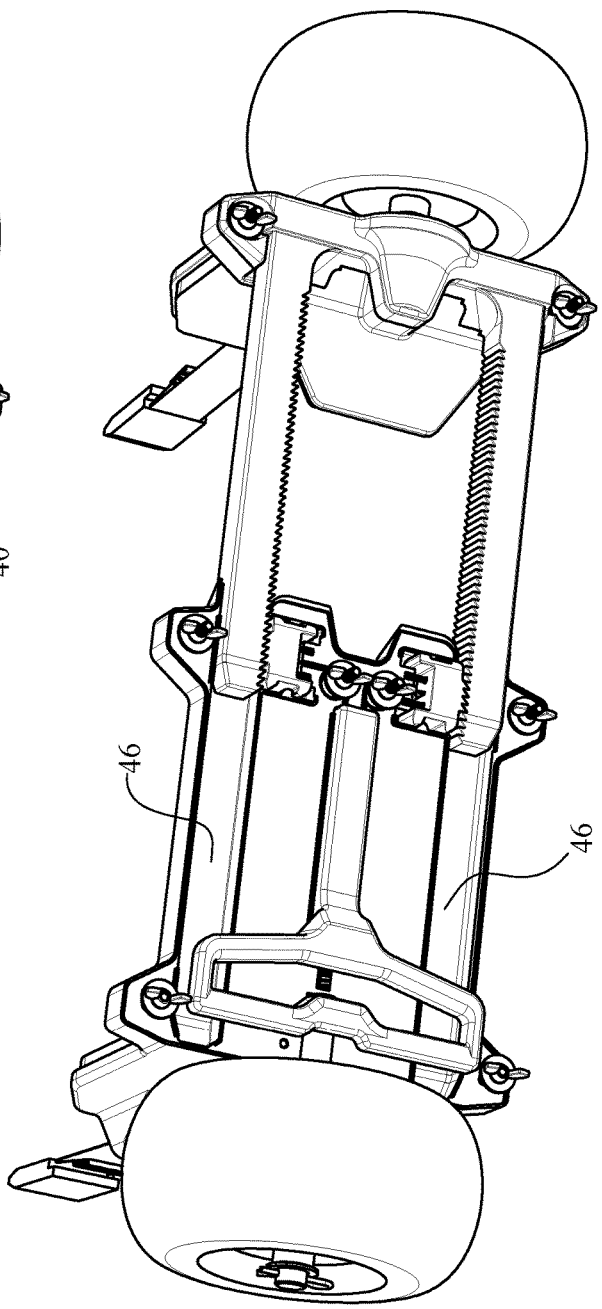

AXIALLY-EXPANDABLE COOLER CART AND ITS METHOD OF USE

CROSS-REFERENCE TO RELATED APPLICATIONS

This application claims the benefit of U.S. Provisional Application No. 62/618,144 filed Jan. 17, 2018, the disclosure of which is incorporated herein by reference in its entirety.

TECHNICAL FIELD

The technology described herein generally relates to carts for carrying containers, and more particularly relates to coolers.

BACKGROUND

Recreation such as camping, children and adult sporting events, and going to the beach usually includes one or more large volume ice coolers (also known as ice chests) with beverages, ice and food. Such cooler usually includes a container with a closable lid, and one or more handles for lifting and carrying the laden cooler. Efforts to assist in the lifting and carrying of heavy ice coolers has include a two-wheeled cart for carrying the weight of the cooler while the user pulls the cooler forward.

Notwithstanding, there is a continuing need for an improved pour spout and lid for a wide-mouthed jar that has improved features for the cleaning of the pour spout and lid, and with improved sealing properties.

SUMMARY OF THE INVENTION

The present invention provides a two-wheeled cooler cart having an axially-expandable platform, and a method for hauling a cooler using the two-wheeled, axially-expandable cart.

The present invention provides a two-wheeled, axially-expandable cart including: an axially-expandable platform, including a first platform member having an outer edge and a proximal edge, and a second platform member having an outer edge and a proximal edge, wherein the first platform member and the second platform member are moveable axially between a collapsed position where the respective proximal edges are in a confronting position, and an expanded position when the respective proximal edges are in a separated position with space between the first platform member and the second platform member; and a pair of wheels, including a first wheel connected through an axle to, and extending axially from, the outer edge of the first platform member, and a second wheel connected through an axle to, and extending axially from, the outer edge of the second platform member.

In an embodiment of the invention, the two-wheeled, axially-expandable cart according to the invention, further including at least one extender device including: a pair of elongated racks disposed on an underside of the first platform member, that extends axially from the proximal edge of the first platform member, the rack including a series of teeth along a length of the rack; a pair of elongated channel disposed on an underside of the second platform member, each channel extending axially and registering with one of the elongated racks, and configured to allow the rack to move axially along the channel; and a locking block moveable transversely to each rack, between a first position in which the locking block is disengaged from the rack, to allow the rack to move freely within the channel, and a second position in which the locking block is engaged with the rack, to fix the rack in an axial position within the channel.

In a further embodiment, the rack includes a series of ratcheting teeth, and the locking block includes a series of teeth that engage and disengage with the teeth of the rack. In another embodiment, the teeth of the rack and the teeth of the locking block comprise ratcheting teeth that allow the rack to extend into channel when the teeth of the locking block are engaged with the teeth of the rack.

In another embodiment, the locking block is in mechanical communication with a release handle, wherein the locking block moves away from the rack in response to a manipulation of the release handle in a direction axially and away from the locking blocks.

In another embodiment, the shape of the proximal edge of the first platform member is a complementary shape to a shape of the proximal edge of the second platform member.

In another embodiment, the wheel is a polyurethane balloon wheel.

In another aspect of the invention a method is provided for hauling an insulated cooler, comprising the steps of: a) providing a two-wheeled, axially-expandable cart according to the invention, b) manipulating the first platform member and the second platform member of the platform assembly into an expanded position, c) positioning an insulated cooler onto the platform assembly with a center of gravity (CG) of the cooler moved forward from a position over the platform assembly, d) pushing the first and second platform members toward one another to hold the cooler securely between the first and second platform members, e) providing a strap assembly including a securing strap member and an extending strap member, and securing the cooler to the platform assembly of the cart with the securing strap member, f) lacing the extending strap member through a front handle of the cooler, and g) raising by force a distal end of the extending strap member upward and forward to raise the front end of the cooler up and off of the ground, and to haul forward the cooler secured to the two-wheeled, axially-expandable cart.

These and other features and advantages of the present invention will become better understood with reference to the following drawings, description and claims.

BRIEF DESCRIPTION OF THE DRAWINGS

FIG. 2 shows the two-wheeled cart in a collapsed position.

FIG. 3 shows the two-wheeled cart in an expanded position.

FIG. 4 shows a bottom view of the two-wheeled cart.

FIG. 7 shows the two-wheeled cart of FIG. 6 manipulated to expand apart the platforms members of the platform assembly.

FIG. 8 shows the two-wheeled cart of FIG. 7 with the locking means released to the engaged position.

DETAILED DESCRIPTION OF THE INVENTION

The following detailed description provides modes contemplated for carrying out exemplary embodiments of the invention.

Figure 1:
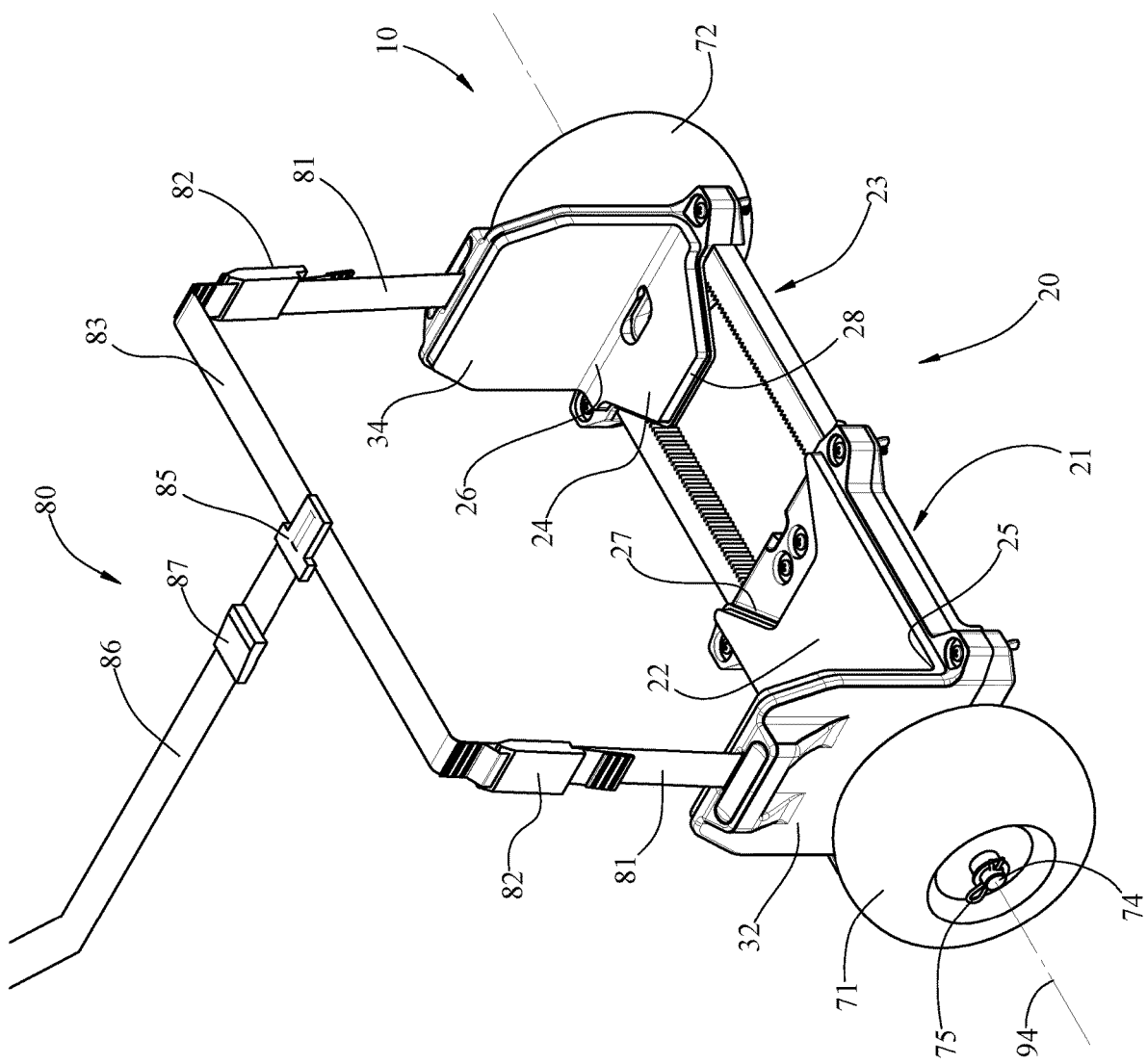
FIG. 1 shows a two-wheeled cart of the invention having an axially-expandable platform.

FIG. 1 shows a perspective view of a two-wheeled cart 10 including an axially-expandable platform assembly 20 and a strap assembly 80. The axially-expandable platform assembly 20 includes a first platform member 21 and a second platform member 23 that are slide-connected to move axially (that is, parallel or along an axis 94) between a closed or collapsed position, shown in FIG. 2, and an expanded position, shown in FIGS. 1 and 3. The first platform member 21 includes a first platform 22 and a first sidewall 32 extending upward from an axially distal edge 25 of the first platform 22. The second platform member 23 includes a second platform 24 and a second sidewall 34 extending upward from an axially (along the axis line 94) distal edge 26 of the second platform 24. The first platform 22 includes an axially proximal edge 27, and the second platform 24 includes an axially proximal edge 28. The proximal edge 27 of the first platform 22 is configured to register with the proximal edge 28 of the second platform 24 in a confronting position (FIG. 2) when the axially-expandable platform assembly 20 is in the closed or collapsed position, while the respective proximal edges 27 and 28 are configured in a separated position (FIG. 3) when the axially-expandable platform assembly 20 is in an expanded position.

FIG. 1 also shows a first wheel 71 attached to the first member 21 through an axle 74, and a second wheel 72 attached to the second member 22 through a similar axle 74. The axles 74 are disposed along an axis 94 parallel with a plane passing through the upper surfaces of the first and second platforms 22, 24. In an embodiment the respective axles 74 are secured into the first and second platforms 22, 24. The wheels 71,72 can be secured to the axles 74 with a fastener 75, for example, a cotter pin.

Each wheel 71,72 can be a polyurethane balloon tire that features a resilient tire material, available from Wheeleez, Inc. (wheeleez.com/wheels/pu/). Other convention pneumatic and bladderless tires can also be used. Typically, the axles 74 are secured in non-rotative position to the respective first and second platforms 22, 24, the respective wheels 71,72 are rotatably secured to the distal ends of the axles 74.

The first platform 22 and the first sidewall 32 are joined to form a right angle, and can be rigidly fixed in position, or can be hinged along the distal edge of the platform. Likewise, the second platform 24 and the second sidewall 34 are joined into a right angle, and can be rigidly fixed in position, or can be hinged along the distal edge of the platform. The respective sidewall and platform can be formed unitarily, or can be two or more parts secured or fastened together by well-known means.

As shown in FIG. 2, the first platform 22 includes an upper member 21a and a lower member 21b, joined and secured face to face with fasteners 70,71,72, for example, with a bolt and nut through a bore in the respective upper member 21a and lower member 21b.

The second platform member 23 includes a pair of spaced-apart extending racks 40, extending axially from opposite sides of the second platform 24. The racks 40 are positioned beneath and extend axially from under the second platform 23. The first platform 21 has a pair of spaced-apart elongated channels 42, extending along opposite sides of the first platform 21, and parallel with the axis 94, which register with and are configured to receive the entire length of the extending racks 40 when the two-wheel cart is in the closed position. The elongated channels 42 can shaped and configured for fully extracting the extending racks 40 to the expanded position, and separating the first platform member 21 from the second platform member 23. In another embodiment, the distal ends 44 (shown in FIG. 5) can include a stop means to stop and retain the distal ends 44 in the channels 42, and preventing separation of the first and second platform members.

Figure 5:
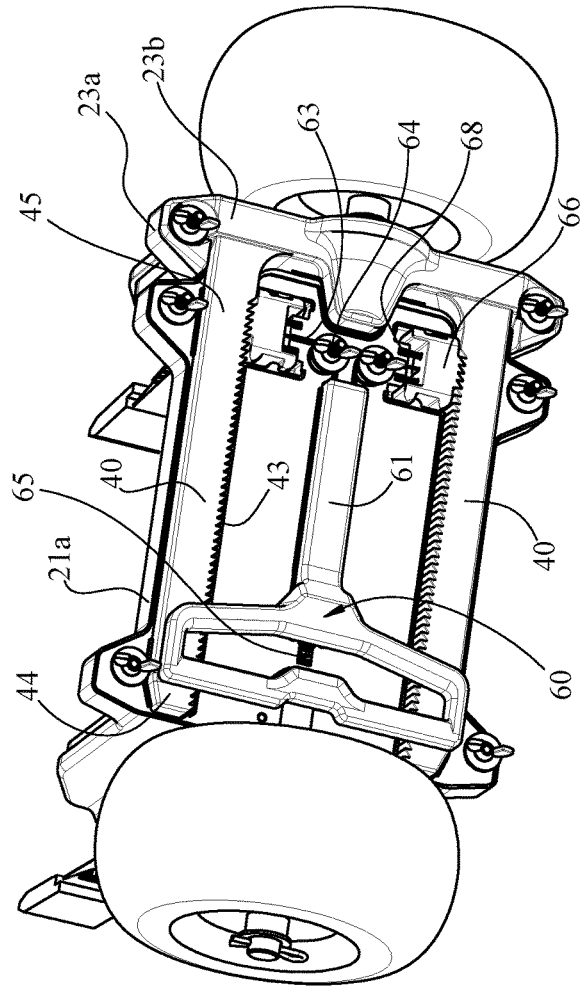
FIG. 5 shows the two-wheeled cart in a closed position with the locking means in an engaged position.
Figure 6:
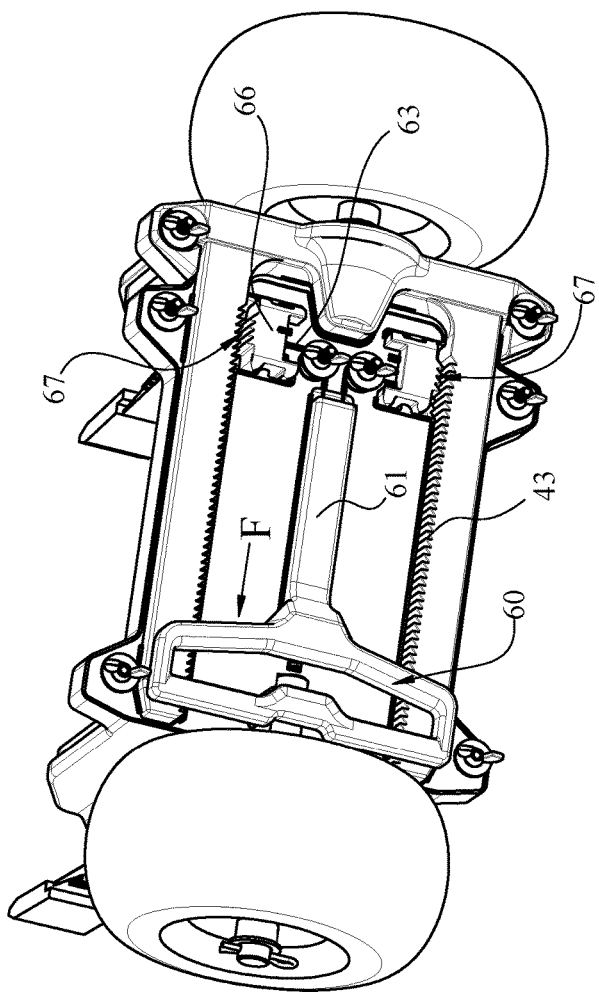
FIG. 6 shows the two-wheeled cart of FIG. 5 with the locking means manipulated to a disengaged position.

In an embodiment, the cart assembly can include a means for locking that can be manually actuated from a lock position to an unlocked position. In the illustrated embodiment shown in FIG. 4, the locking means includes a handle 60 on an underside of the platform assembly, which can be manipulated or pulled to actuate the locking means. FIGS. 5 and 6 illustrate the features of the locking means. The handle 60 is positioned at the proximal end of the underside of the first platform member 21. The locking means also can include a biasing means, such as a compression spring 65, which is compressed when manipulating the handle 60 from the released position (FIG. 5) to the activated or pulled position (FIG. 6), and which can return the handle 60 to the released position when the force F applied to the handle 60 is released (FIG. 8). The handle 60 also includes a limb 61 extending axially toward the second platform member 23.

The locking means also includes a plurality of spaced-apart teeth 43 disposed in a series along an inwardly-facing edge of each extending rack 40. The locking means further includes a pair of locking blocks 66. Each locking block 66 is positioned within the first platform member 21, and each locking block 66 includes a plurality of teeth 67 spaced apart in series along an outwardly-facing edge. A cable 63 is attached at one end to the opposite, inwardly-facing edge of each locking block 66, and extends laterally to wrap around a pulley wheel 64 and axially to attach to the distal end of the limb 61 of the handle 60. Each locking block 66 is configured for lateral movement between the engaged position, at which the teeth 67 register and engage the teeth 43 of the elongated racks 40, and a disengaged position, at which the teeth 67 are not in engagement with the teeth 43 of the elongated racks 40. A compression spring 68 (FIG. 5) is position to bias the locking block 66 into the engaged position. When the handle 60 is pulled distally, away from the pulleys 64, the cables 63 draw the pair of locking blocks 66 to the disengaged position. When the force on the handles 60 is removed, the compression springs 63 return the pair of locking blocks 66 to the engaged position. In the engage position, the pairs of teeth 67 of the locking blocks 66 engage the teeth 43 of the racks 40, to at least prevent the second platform member 23 from further expanding away from the first platform member 21.

In another embodiment, the locking means can allow the second platform member 23 to be moved axially toward the first platform member 21, without having to disengage the securing means, and specifically, without having to pull on the handle 60 to disengage the teeth 63 of the blocking blocks 66 from the teeth 43 of the racks 40. In an embodiment of the invention, the teeth 43 of the rack 40 have an angled surface that faces an angled surface of the teeth 67 of the locking blocks 6, thereby forming pairs of ratcheting teeth. The pairs of ratcheting teeth allow the rack 40 to move axially, by ratcheting, into and along the channel 42, which allows the first and second platform members to be collapsed even while the locking block 66 is in the engaged position. The opposite faces of the respective teeth 43,67 are typically square (perpendicular to the axis) to prevent axial movement, preventing the first and second platform members from expanding unless the handle 60 is pulled and the locking block 66 disengaged.

In an alternative embodiment, a lock and release mechanism can include a plurality of holes disposed in the extending racks, with a pin dispose in the first platform member and extendable into and out of the channel 42, to position and lock the racks 40 with the channels 42, by moving the pin between a lock position, dispose within one of the holes, and an unlocked position, withdrawn from a hole.

FIGS. 5-8 illustrate a method for expanding and closing the platform assembly 20. The platform assembly 20 in FIG. 5 is in the closed position, with the handle 60 and the locking blocks 66 in the engaged positions. To expand the platforms, the user grasps the handle 60 and pulls distally, drawing the locking blocks 66 to their disengaged positions, shown in FIG. 6. With the handle 60 pulled, the user pulls the two platform members 21,23 apart (under forces E1 and E2), to expand the platform assembly 20 to an expanded position, shown in FIG. 7. Once the user releases the pulling force F on the handle 60, the locking blocks 66 engage the racks 40, as shown in FIG. 8. Further expansion of the two platforms members is prevented by the teeth 67 of the locking blocks 66 engaging with the teeth 43 of the racks 40. In the illustrated embodiment, wherein the respective teeth of the racks 40 and locking blocks 66 are ratcheting teeth, the platform assembly shown in FIG. 8 can be compressed back to the closed position of FIG. 5 without needing to manipulate the handle 60.

Figure 9:
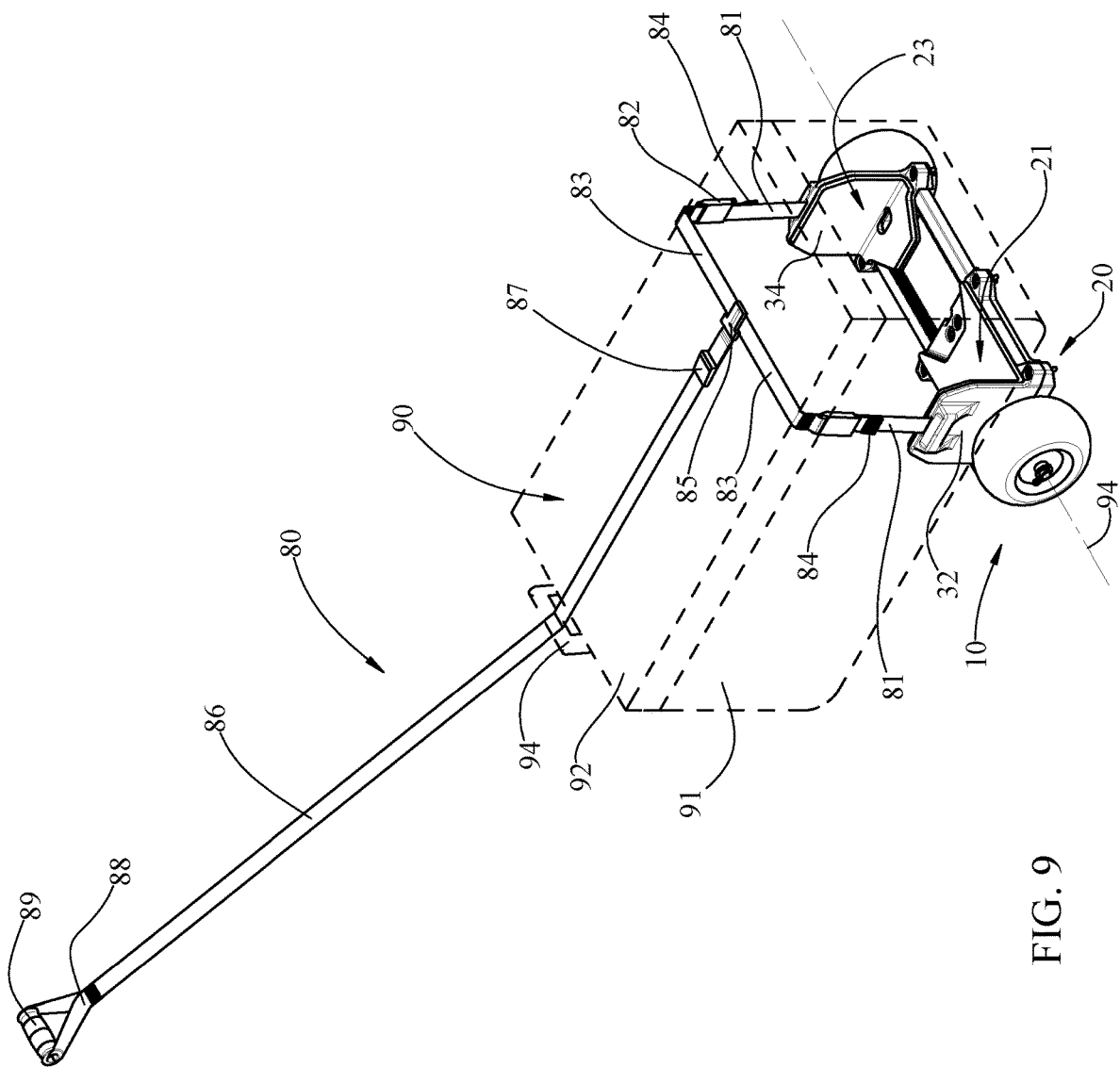
FIG. 9 shows the two-wheeled cart of FIG. 1 with a cooler mounted on the cart, and being hauled with a strap assembly.
Figure 10:
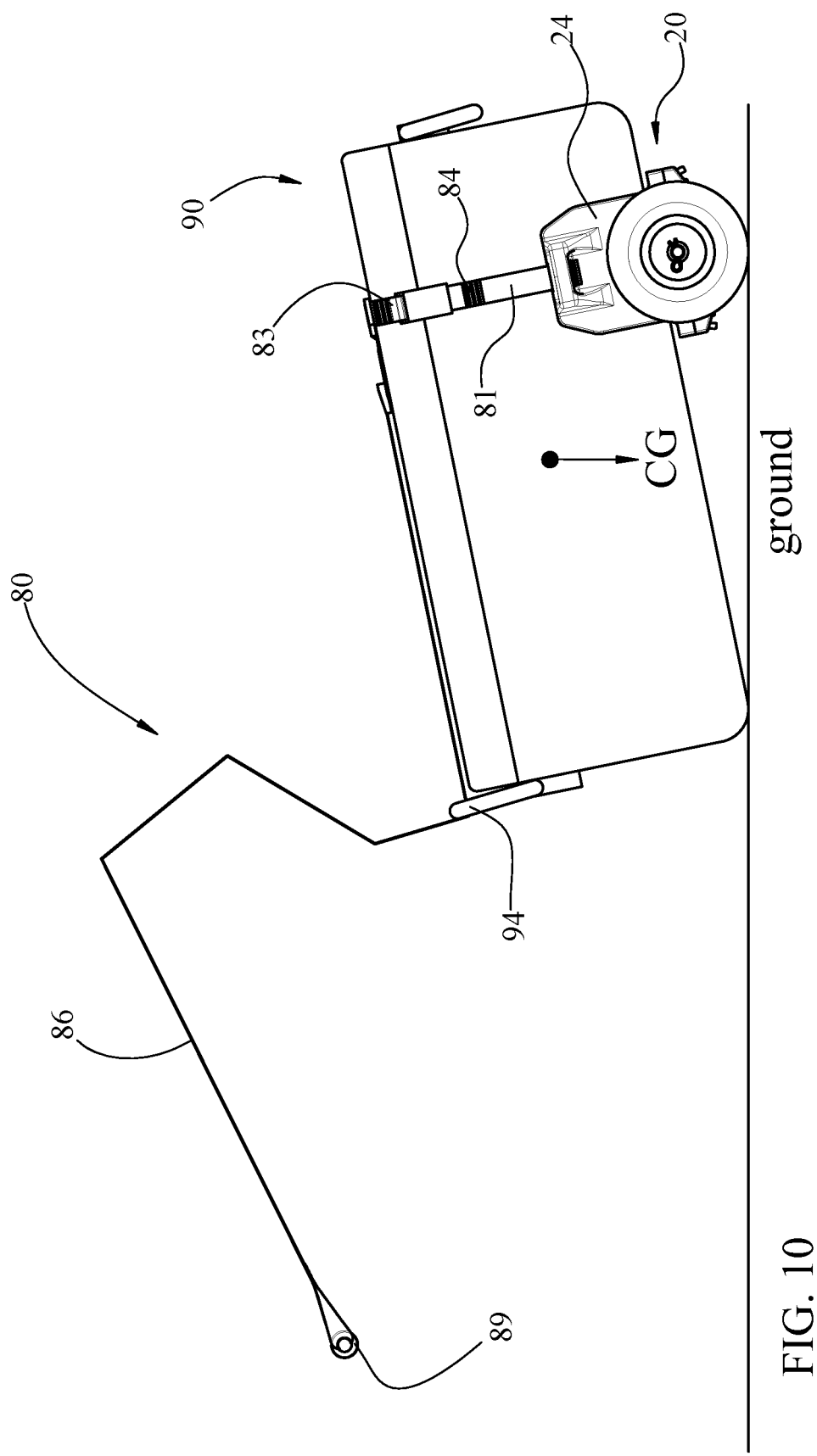
FIG. 10 shows the cooler positioned on the two-wheeled cart with the center of gravity of the cooler positioned forward of the platform assembly, and secured to the two-wheeled cart with the strap assembly.
Figure 11:
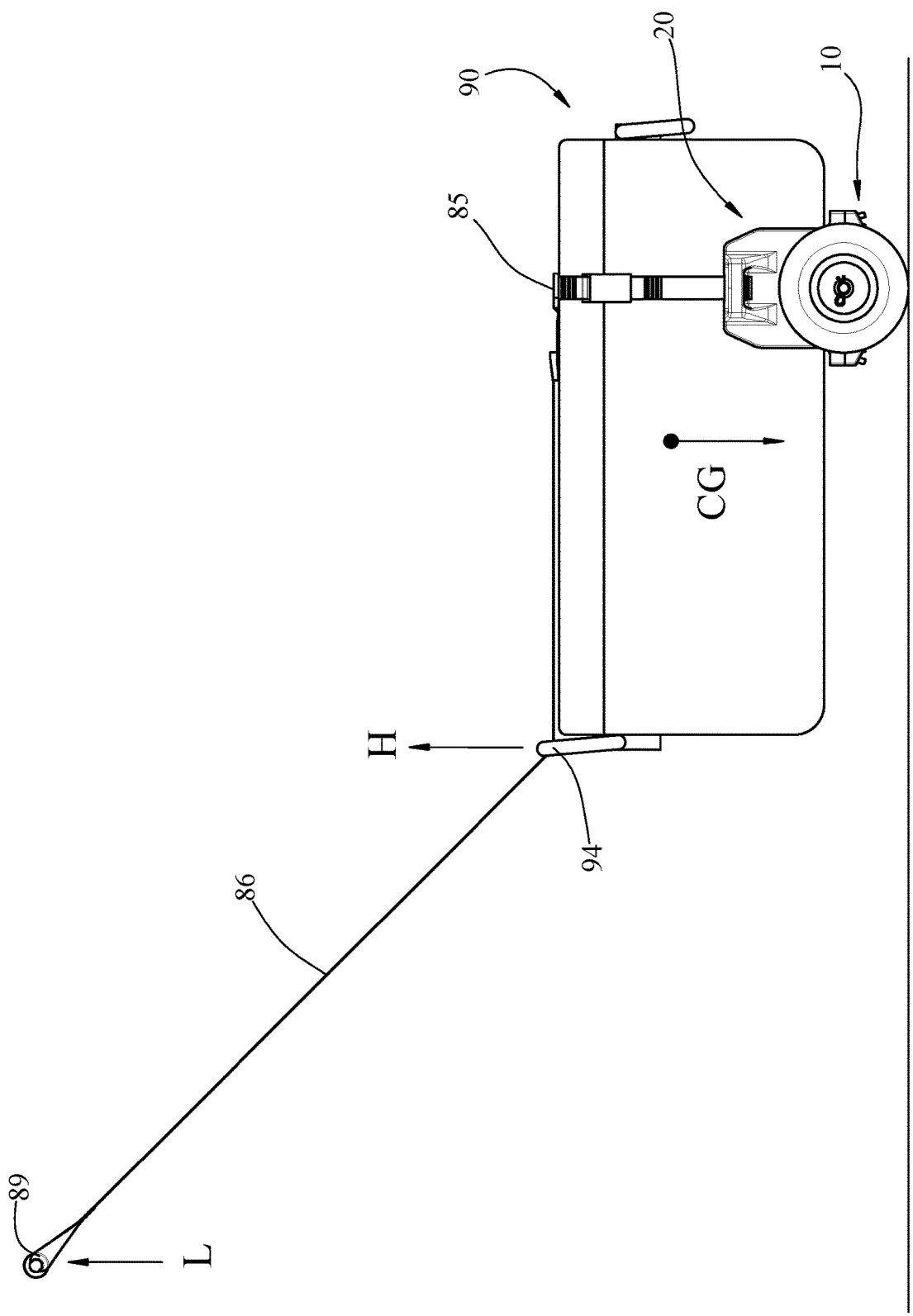
FIG. 11 shows the strap assembly extended through the front handle of the cart, and the handle raised to lift the front end of the cooler off the ground.

In a method for hauling a cooler using the two-wheeled, axially-expandable cart, a two-wheeled cart 10 is provided. The two-wheeled cart 10 is manipulated to an expanded position shown in FIG. 9. As shown in FIG. 10, the cooler 90 is positioned onto the platform assembly 20 of the two-wheeled cart 10 so that the center of gravity (CG) of the cooler 90 is moved forward from a position over the platform assembly 20. The first and second platform members 21 and 23 are then pushed toward one another, to hold the cooler 90 securely between the first and second sidewalls 24,34. The strap assembly 80 is provided to secure the cooler to the platforms assembly 20, and includes a securing strap member and an extending strap member. The securing strap member includes a pair of buckle straps 81, secured at one end to the upper ends of the respective sidewall 32 and 34, and a buckle 82 at the other end. A cover strap 83 includes opposed ends 84 that lace through the buckles 82. The cover strap 83 is position over the lid 92 and secured around the cooler 90 by pulling down on the ends 84 of the cover strap portion 83. The extending strap portion 86 is laced through the front handle 94 of the cooler 90, and the handle 89 extended, as shown in FIG. 11. When the handle 89 is extended, the upward force L on the handle 94 of the cooler applies a lifting force H on the handle 94 at the front end 97 of the cooler 90, to lift the front end 97 of the cooler 90 up and off of the ground. The strap 80 lifting the front handle 94 of the cooler 90 forms a class 2 lever, with the load (center of gravity (CG) of the cooler 90) between the fulcrum (platforms assembly) and the lifting force (handle 89). The further forward the center of gravity CG of the cooler 90 from the platform assembly 20, the more stable the hauling of the cooler 90, and the greater the lifting force L needed to raise the front end 97 of the cooler 90 from the ground.

It should be understood, of course, that the foregoing relates to exemplary embodiments of the invention and that modifications may be made without departing from the spirit and scope of the invention as set forth in the following claims.

We claim:

1. A two-wheeled, axially-expandable cart including:
an axially-expandable platform, including a first platform member having an axially-distal edge and a proximal edge, and a second platform member having an axially distal edge and a proximal edge, wherein the first platform member and the second platform member are moveable axially between a collapsed position where the respective proximal edges are in a confronting position, and an expanded position when the respective proximal edges are in a separated position with space between the first platform member and the second platform member;
a pair of wheels, including a first wheel connected through an axle to, and extending axially from, the distal edge of the first platform member, and a second wheel connected through an axle to, and extending axially from, the distal edge of the second platform member;
and further including at least one extender device including:
a pair of elongated racks disposed on an underside of the first platform member, that extends axially from the proximal edge of the first platform member;
a pair of elongated channels disposed on an underside of the second platform member, each channel extending axially and registering with one of the elongated racks, and configured to allow the rack to move axially along the channel; and
a locking block moveable transversely to each rack, between a first position in which the locking block is disengaged from the rack, to allow the rack to move freely within the channel, and a second position in which the locking block is engaged with the rack, to fix the rack in an axial position within the channel.

2. The two-wheeled, axially-expandable cart according to claim 1, wherein each rack includes a series of teeth, and each locking block includes a series of teeth that engage and disengage with the teeth of the rack.

3. The two-wheeled, axially-expandable cart according to claim 2, wherein the teeth of the rack and the teeth of the locking block comprise ratcheting teeth that allow the rack to move axially and extend into the channel when the ratcheting teeth of the locking block are engaged with the ratcheting teeth of the rack.

4. The two-wheeled, axially-expandable cart according to claim 3, wherein the locking block is in mechanical communication with a release handle, wherein the locking block moves laterally away from the rack in response to a manipulation of the release handle in a direction axially and away from the locking blocks.

5. The two-wheeled, axially-expandable cart according to claim 1, wherein the wheel is a polyurethane balloon wheel.

6. A method for hauling an insulated cooler, comprising the steps of:
a) providing a two-wheeled, axially-expandable cart according to claim 1,
b) manipulating the first platform member and the second platform member of the platform assembly into an expanded position, c) positioning an insulated cooler onto the platform assembly with a center of gravity (CG) of the cooler disposed forward from a position over the platform assembly, d) pushing the first and second platform members axially toward one another to hold the cooler securely between the first and second platform members, e) providing a strap assembly including a securing strap member and an extending strap member, and securing the cooler to the platform assembly of the cart with the securing strap member, f) lacing the extending strap member through a front handle of the cooler, and g) raising by a user's lifting force a distal end of the extending strap member upward and forward to raise the front end of the cooler up and off of the ground, and to pull forward the cooler secured to the two-wheeled, axially-expandable cart.

7. The two-wheeled, axially-expandable cart according to claim 1, wherein the shape of the proximal edge of the first platform member is a complementary shape to a shape of the proximal edge of the second platform member.

\* \* \* \* \*